DATA TRANSMISSION SYSTEM UTILIZING A START SIGNAL

Filed Feb. 20, 1961 2 Sheets-Sheet 1

INVENTORS
STEN LENNART KARLSTEDT
STIG ERIK WARRING
BY Hane and Nydick
ATTORNEYS

DATA TRANSMISSION SYSTEM UTILIZING A START SIGNAL

Filed Feb. 20, 1961 2 Sheets-Sheet 2

INVENTORS
STEN LENNART KARLSTEDT
STIG ERIK WARRING
BY Hane and Nydick
ATTORNEYS 3,149,283
DATA TRANSMISSION SYSTEM UTILIZING A START SIGNAL Sten Lennart Karlstedt, Farsta, and Stig E. Warring, Hagersten, Sweden, assignors to Telefonaktiebolaget L M Ericsson, Stockholm, Sweden, a corporation of Sweden Filed Feb. 20, 1961, Ser. No. 90,473
Claims priority, application Sweden Feb. 23, 1960
1 Claim. (Cl. 325—30)

Figure 1:
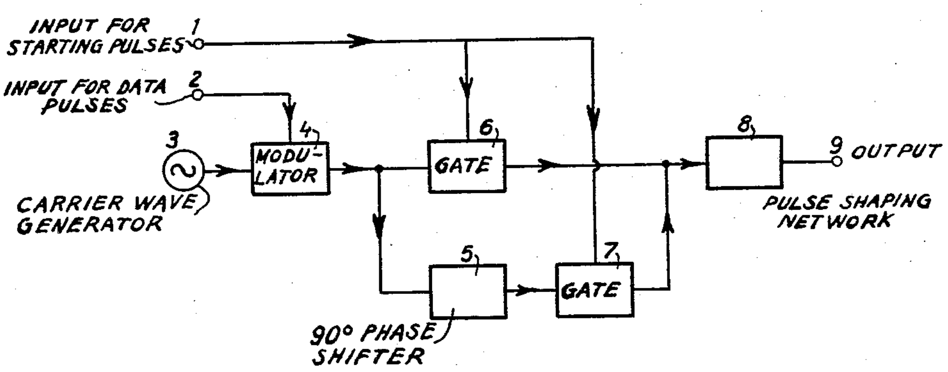

The present invention refers to a data transmission arrangement, where the transmitted information is expressed in pulse form according to the binary system, and where these binary data pulses are transmitted by means of phase positions of a carrier wave, which phase positions are displaced 180° relatively one another.

Information is often transmitted in digital form, as the case is for example for information transmission between data processing centres, where the information in question has binary form. Even if the information is in analogy form it can often be to advantage to transform it to digital form for the transmission. As an example of this remote metering and telephony transmission by pulse code modulation may be mentioned.

Pure direct current pulses are not suitable for the purpose when the information is to be transmitted over great distances, or when frequencies near zero cannot be transmitted. For the transmission, the direct current pulses are therefore generally transformed to amplitude, frequency or phase modulated pulses.

During data transmission the sent information is divided into signals, and at the beginning of each signal some kind of starting signal is sent so that the receiver is able to distinguish between the different signals and to know when the particular signal starts. In time-divided multi-channel telephony transmissions starting signals are also required to assist with distinguishing the different telephony channels.

In previously known data transmission arrangements the starting signal is generally transmitted in the form of one or several pulses which are modulated with a frequency which lies at one end of the frequency band used for the transmission. However, the lines, which are used for the transmission have always a certain transit time, which is different for different frequencies, and the transit time distortion varies also between different lines. A data transmission communication can be set up in several different ways, and the transit time as a function of the frequency will then be different for different systems. The transit time distortion is as a rule greatest at the ends of the frequency band, and therefore a frequency at one end of the frequency band, which is used for transmission of starting signal, will be delayed more or less in relation to the data pulses, depending upon which connecting path is set up at that moment, and as a result the correct function of the receiver becomes uncertain.

These difficulties are avoided in a relatively simple way when data pulses and starting signals are transmitted by the same carrier wave as suggested in the present invention. However, the invention is also applicable to a frequency or phase modulated system when starting signals are transmitted by a special frequency, which for example is near one end of the frequency band used for the transmission.

According to this the present invention refers to an arrangement for transmission of signals, which are composed of binary data pulses comprising means for transmitting a starting signal in the form of a special frequency in arrangements working with frequency modulation or phase modulation, or a special phase in arrangements working with phase modulation during a time interval which is short in relation to the length of a transmitted signal. The receiver side then comprises such a frequency or phase detector that its output-signal is zero at the reception of said frequency or phase. A zero signal indicator is connected to the outlet of the detector, and the indicator is so arranged that it produces an output-potential when the output-signal of said detector is zero. An amplitude detector is connected with its inlet to the inlet of the receiver side, the time constant of said amplitude detector being smaller than the time interval during which the starting signal is sent, the zero signal indicator and the amplitude detector having their outlets connected to an "and"-circuit in such a way that a starting signal is indicated only when the output-signal of the frequency respectively the phase detector is zero at the same time as the output-signal of the amplitude detector is separated from zero.

The invention will now be further described in connection to the accompanying drawing, in which FIG. 1 shows a phase modulated data transmitter, FIG. 2 a phase or frequency modulated data receiver, FIG. 3 some different diagram forms in connection to a data receiver according to FIG. 2, and FIG. 4 a discriminator diagram.

FIG. 1 shows a data transmitter in a phase modulated data transmission arrangement, where a transmitter inlet 1 is fed with a starting pulse, which for example is three bits long, and a second transmitter inlet 2 is fed with data pulses, in which pulses for example a one is corresponded by a positive pulse and a zero by a negative pulse. A signal will now consist of a starting pulse followed by the data pulses in question. The transmitter also comprises a carrier frequency generator 13 and a phase modulator 4, which latter in its simplest form may consist of a common ring modulator, which is controlled by the data pulses in such a way that a negative data pulse transmits the carrier frequency of the generator 3 directly, while a positive data pulse transmits the carrier frequency with a phase shift of 180°. There is also provided a phase shifting network 5, the phase shift of which is 90° for the carrier frequency in question. During the starting pulse interval there are no data pulses, and the inlet 2 is then assumed having negative potential so that the modulator 4 transmits the carrier frequency without phase shift. The starting pulse closes a gate 6, which otherwise is open, and opens a second gate 7, which otherwise is closed. These gates may suitably be of a previously known electronic type. During the starting pulse interval the carrier frequency will thus be transmitted with a phase shift of 90°. Over a pulse forming network 8, for instance, a band pass filter, starting and data pulses are then fed to a suitable transmission medium which is connected to the transmitter outlet 9.

A data transmitter of a frequency modulated data transmission arrangement comprises a frequency modulator. It is modulated by the data pulses in such a way that for example a positive data pulse corresponds to a one, the modulation of the modulator being such that a higher frequency than the center-frequency of the modulator is sent while a negative data pulse corresponding to a zero modulates the modulator so that a lower frequency than the center-frequency of the modulator is sent. Only during the time, when a starting signal is to be sent out, the modulated signal fed to the frequency modulator has the potential zero, and the modulator sends then center-frequency.

With frequency and also with phase modulated data transmission arrangements a special frequency placed for example at one end of the frequency band used for the transmission can be sent to represent a starting signal.

Figure 2:
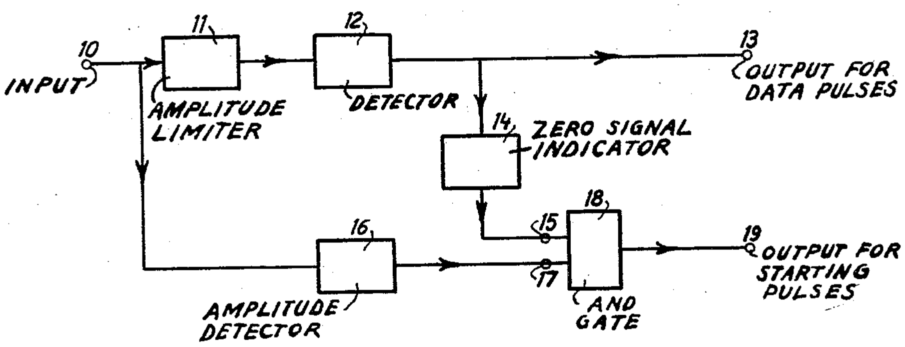
Figure 3:
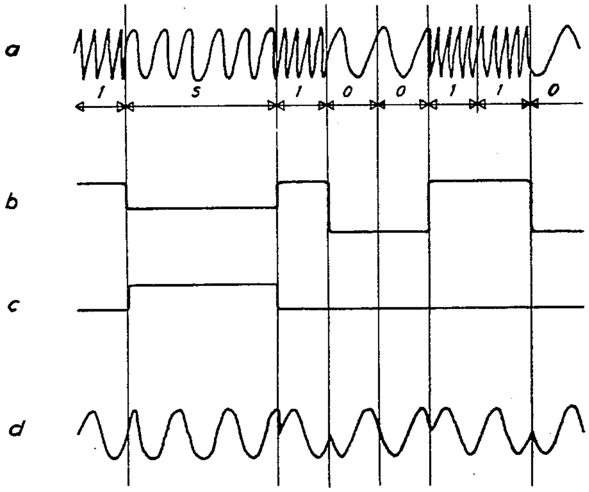

FIG. 2 shows a data receiver according to the invention. First it is assumed that a frequency modulated data transmission system is used. The signal arrives from the line at the receiver inlet 10, possibly over a level compensator and a band pass filter and, if the data speed is relatively high so that only a few full periods of the carrier frequency appear per data pulse, suitably also over a transposition device, in which the arriving signal is transposed to a higher frequency band so that each data pulse will contain a number of carrier frequency periods. The transposition device, like the level compensator and the band pass filter, is not shown in the drawing since they are not necessary for the invention. The signal is then fed to an amplitude limiter 11 and from there further on to a frequency detector 12. The shape of the incoming carrier frequency signal appears from FIG. 3*a*. During the interval of three bits, which there is indicated *s*, a starting signal arrives represented by center-frequency. During the interval 1, the frequency is higher and during the interval 0 the frequency is lower than the center-frequency. The frequency detector 12 produces at its outlet 13 an output-signal according to FIG. 3*b*, that is, a positive potential during the intervals, which correspond to ones, and a negative potential during the intervals, which correspond to zeros. During the interval *s*, that is, when the starting signal appears in the form of center-frequency, the output-potential of the frequency detector is equal to zero. The output-signal of the detector is furthermore fed to a zero signal indicator 14, which for example may consist of a full-wave rectifier. There the positive output-potentials of the frequency detector are changed, so that a positive pulse according to FIG. 3*c* appears at the outlet 15 of the zero signal indicator during the time interval *s*. This pulse might now indicate starting signal, but a common type of interference at data transmission are short breaks in the transmission, and they give also an output potential equal to zero from the frequency detector and could therewith cause false starting pulses. Such a cause of faults can, however, be eliminated according to the present invention in such a way that an amplitude detector 16, the time constant of which is smaller than the time interval *s* during which starting signal is sent, is connected to the receiver inlet 10. The amplitude detector gives then a positive output potential at the point 17 when signal is fed to the inlet 10. During the starting signal interval both points 15, 17 are thus positive, and an and-circuit 18 transmits then the starting pulse signal to the receiver outlet 19. When a signal corresponding to a one or to a zero is fed, the point 15, however, becomes negative and if there is a break in the transmission line the point 15 is, of course, positive, but now the point 17 becomes negative and the and-circuit 18 will be blocked in these two cases.

Figure 4:
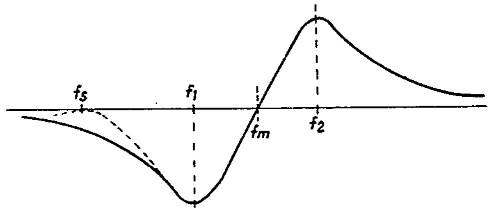

If the transmitter sends a frequency $f_s$ as a staring signal, see FIG. 4, which frequency lies at one end of the frequency band used for the transmission, this frequency will be so different from the resonance frequencies $f_1$ and $f_2$ of the frequency detector that output-signal is very near zero for said frequency. Possibly the frequency detector, the normal discrimination diagram of which appears from the full line diagram in FIG. 4, may be modified in such a way that the diagram near the frequency $f_s$ obtains the dash-marked course. The last-mentioned frequency then gives an output-potential equal to zero after the frequency detector. The invention can thus be applied also when the frequency used as starting information is not equal to the center-frequency $f_m$ but is situated at one end of the transmission band.

With a phase modulated data transmission system the operation will be somewhat different. The signal fed at the receiver inlet can for example have the appearance shown in FIG. 3*d*. In order to simplify the description a full period of the carrier frequency potential has been made exactly one bit long, but this is, of course, not a necessary condition. As appears from FIG. 3*d* the phase position differs for a one 180° from the phase position of a zero, while the zero position during the starting pulse interval is displaced 90° relatively the phase positions for a one respectively a zero. The fed signal is supplied via amplitude limiter 11 to a phase detector 12, which may be designed in a known way per se, the principle being such that the phase position of the arriving signal is compared with a suitable phase reference signal. If when the phase position for the arriving signal corresponds to the phase position of the phase reference potential, the output-potential of the phase detector 12 is for example positive (corresponding to a one), if the phase difference is 180° the output-potential of the detector is negative (corresponding to a zero), and if the phase difference is 90° the output-potential of the detector is zero (corresponding to a starting signal), see FIGS. 3*b* and 3*d*. However, a break in the transmission will also here give the output-potential zero from the detector, and the components 14, 16 and 18 act in this case in exactly the same way as at frequency modulation so that short breaks cannot give false starting pulses.

If at a phase modulated data transmission arrangement the starting signal is transmitted by a frequency which lies at one end of the band used for the transmission, the starting signal will also give an output-potential which is mainly equal to zero from the phase detector and the invention can thus also be applied in such a case.

The invention is, of course, not restricted to the embodiments shown on the accompanying drawing but can be varied as to its details within the scope of invention.

We claim:

A communication system comprising transmitting means for transmitting signals composed of starting pulses and binary data pulses modulated on a carrier wave, modulating means, means for supplying said starting pulses and said binary data pulses to said modulating means together with said carrier wave, said starting pulses being modulated differently from the modulation of said binary data pulses, receiving means for receiving said transmitted modulated signals, said receiving means including one input and two outputs, one for data pulses and one for starting pulses, a detector for detecting said transmitted modulated signals, the output signal from said detector being zero at the reception of said differently modulated signal, a zero-signal indicator connected to the output of said detector and generating an output potential in response to a zero value of said detector, an amplitude detector having an input connected to said input of the receiving means and having a time constant smaller than the duration of said differently modulated signal, and an AND-gate, said zero-signal indicator and said amplitude detector having outputs connected to said AND-gate, the output of said gate being connected to said output for starting pulses of the receiving means to cause a starting pulse to be generated when the output signal of said detector is zero and simultaneously the output signal of said amplitude detector is different from zero.

No references cited.